Figure 6:
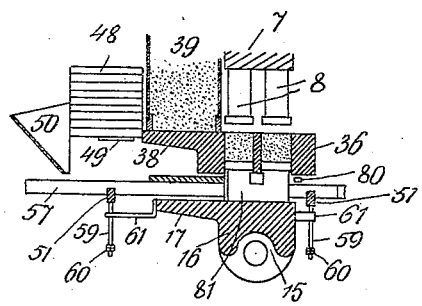

W. T. PRICE.
MACHINE FOR FORMING PLASTIC MATERIAL.
APPLICATION FILED APR. 22, 1907.
929,981.
Patented Aug. 3, 1909.
3 SHEETS—SHEET 1.
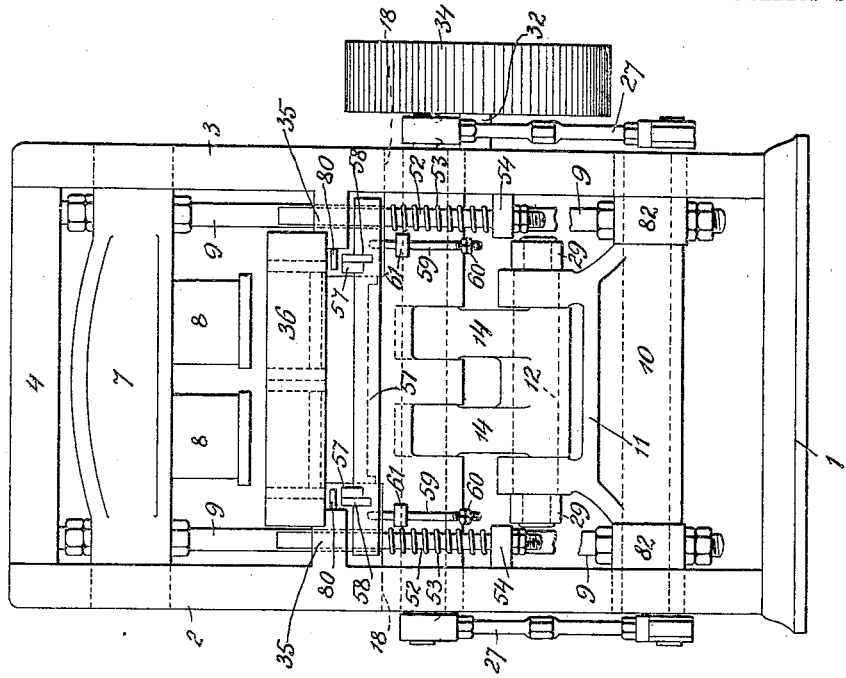
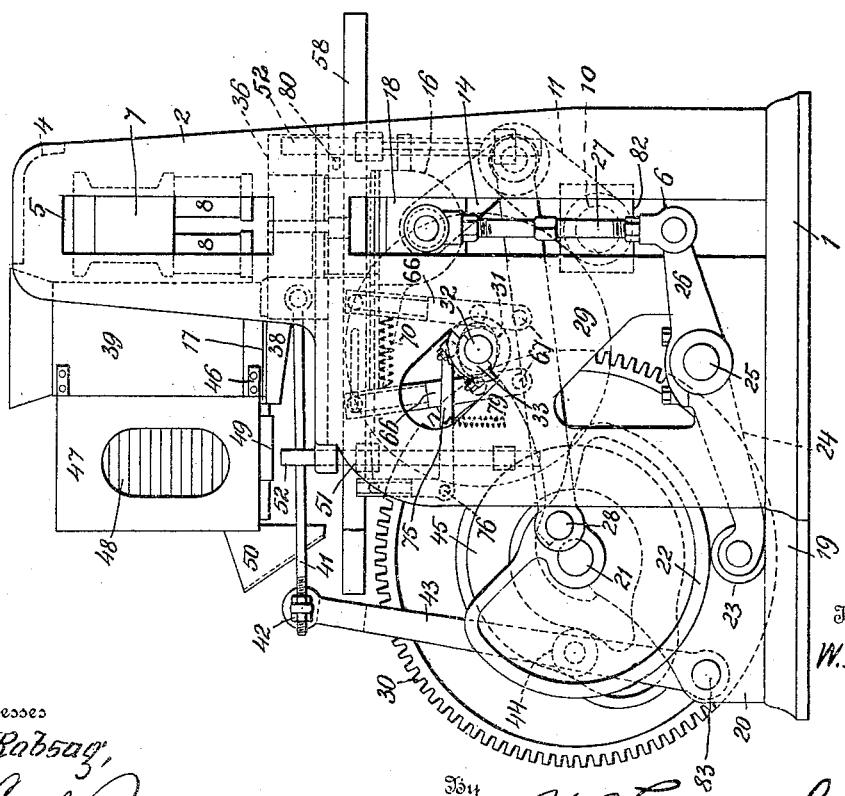
Witnesses
A. H. Rabsag,
R. H. Butler
Inventor
W. T. Price,
By H. C. Evert & Co.
Attorneys

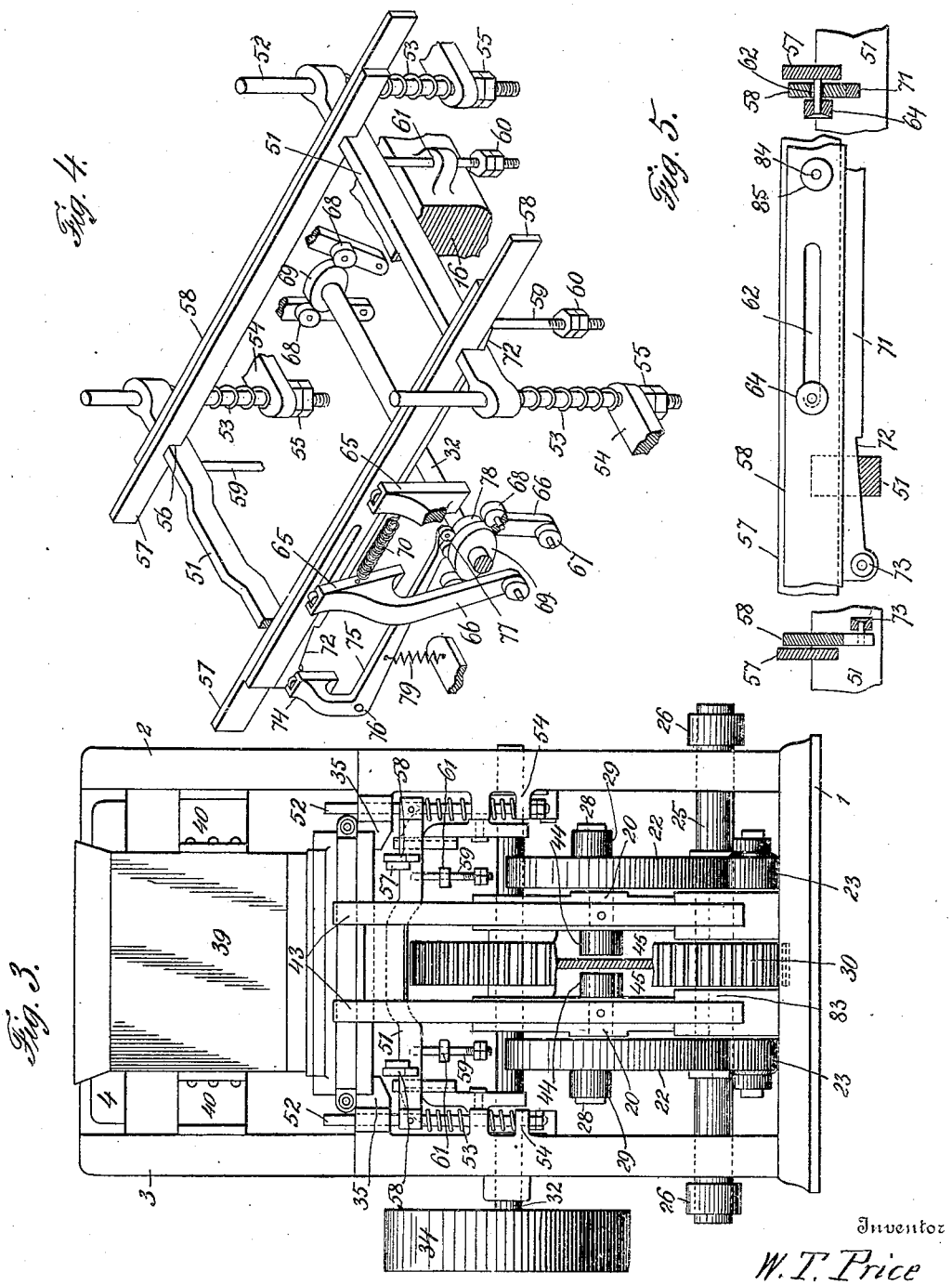
W. T. PRICE.
MACHINE FOR FORMING PLASTIC MATERIAL.
APPLICATION FILED APR. 22, 1907.
929,981.
Patented Aug. 3, 1909.
3 SHEETS—SHEET 2.
Witnesses
A. H. Rabsag,
R. H. Butler.
Inventor
W. T. Price
By H. Everitt
Attorneys W. T. PRICE.
MACHINE FOR FORMING PLASTIC MATERIAL.
APPLICATION FILED APR. 22, 1907.

929,981.

Patented Aug. 3, 1909.
3 SHEETS—SHEET 3.

Witnesses
A. H. Rahsag,
R. H. Butler.

Inventor
W. T. Price,
By H. C. Everett
Attorneys

UNITED STATES PATENT OFFICE.

WILLIAM T. PRICE, OF WHEELING, WEST VIRGINIA, ASSIGNOR, BY MESNE ASSIGNMENTS, TO INTERNATIONAL BRICK MACHINE COMPANY, OF BINGHAMTON, NEW YORK.

MACHINE FOR FORMING PLASTIC MATERIAL.

No. 929,981.      Specification of Letters Patent.      Patented Aug. 3, 1909.

Application filed April 22, 1907. Serial No. 369,645.

*To all whom it may concern:*

Be it known that I, WILLIAM T. PRICE, a subject of the King of Great Britain, residing at Wheeling, in the county of Ohio and State of West Virginia, have invented certain new and useful Improvements in Machines for Forming Plastic Material, of which the following is a specification, reference being had therein to the accompanying drawing.

This invention relates to machines for forming plastic material, and the invention relates more particularly to a machine for forming bricks and similar blocks.

The invention has for its object to provide a novel machine both strong and compact and of few parts, wherein positive and reliable means are employed for effecting a perfect formation of plastic material, and delivering same onto the pallet without abrasion.

The machine is designed to automatically manipulate the upper and lower plungers, the mold, molded material and pallets, during the complete cycle. To this end, I have designed a machine wherein the filling is consummated by a horizontal intermittently reciprocating mold.

In connection with the mold, I use a set of upper plungers and a set of lower plungers, both arranged to move vertically with varying intermittent, yet constricted, motions; the motion being such however, that it is in a downward direction until the material has been formed, and stripped from the mold, after which function the return motion occurs. In connection with the above mentioned forming and stripping mechanism I use a pallet magazine from which pallets are regularly ejected by the mold. By a conveying attachment the pallets are positioned to receive the molded material and then together with the burden are automatically removed from that position.

Heretofore machines have been used wherein the molds were stationary or vertically reciprocated, the filling being accomplished by a horizontally moved mold filler, the stripping performed by an upward motion of the plungers, in some cases combined with the motion of the mold, and the pallets manually inserted or fed to the machine. These machines require large parts in order that the motion be sufficient to raise the upper plungers high enough to admit the additional mold filler between the mold and upper plungers, and in some cases the formed material is damaged by horizontally sliding onto the pallet. Again in many cases the mold filler encounters excessive resistance through sliding on metal while loaded, the plastic material adhering to the surfaces. These machines generally require considerable attention and accuracy upon the part of an operator to accomplish the best results.

Other machines have been constructed wherein the material is pressed upon the pallet and then removed thereon, but this method has two well defined defects. First, the pressure cannot be made sufficient to form perfect shapes because the pressure must be endured by the pallets. These pallets being usually made of wood, the necessary pressure would cause the pallets to become indented or split. Secondly, as the junction of the pallet and the bottom of the mold space usually admits of material escaping, thus creating a "fin" (leaving imperfect edges on the lower surface of the material) and further being then in the lowest position in the mold, the formed material is not subjected to that wiping or smoothing action that a longer travel through the smooth mold affords.

In designing my improved machine, I have abolished the mold filler with its attendant evils. I have made the motion of my plungers downward while stripping the molded material from the mold, and have provided means for the automatic feed of the pallets. I have aimed to produce a simple and efficient mechanism for positively producing and ejecting perfectly formed material without the close attention of an operator, the machine to all intents and purposes being practically automatic.

The detail construction entering into my invention will be hereinafter more fully described and then specifically pointed out in the appended claims, and referring to the drawing forming part of this specification like numerals of reference designate corresponding parts throughout the several views, in which:—

Figure 7:
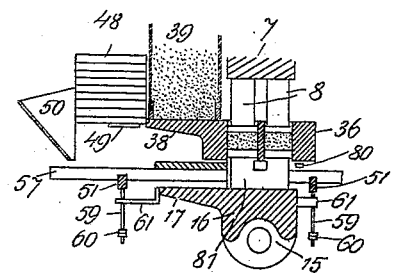
Figure 8:
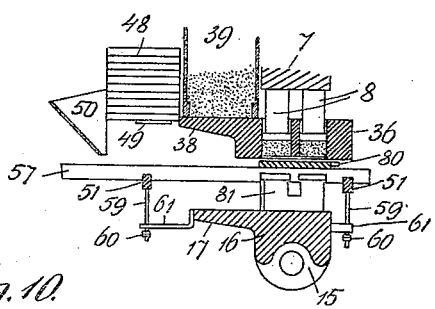
Figure 9:
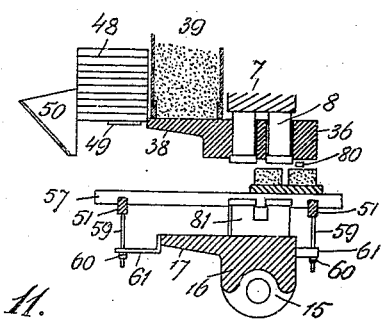
Figure 10:
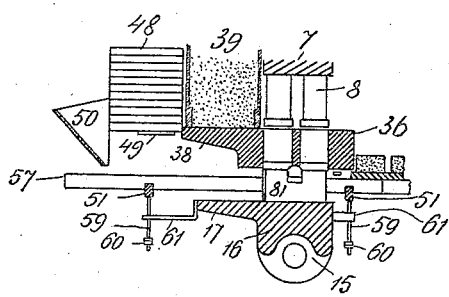
Figure 11:
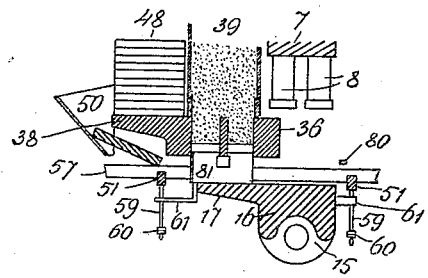
Figure 12:
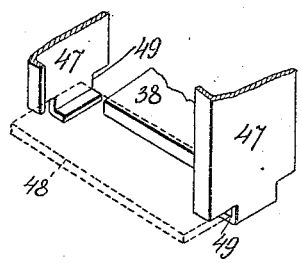

Figure 1 is a side elevation of my improved machine, Fig. 2 is a front elevation of the same, Fig. 3 is a rear elevation of the machine with the pallet magazine removed, Fig. 4 is a perspective view of a pallet shifting mechanism, Fig. 5 is a cross sectional view of a portion of the same, Fig. 6 is a detail sectional view of the machine, illustrating the mold filled with plastic material and closing the hopper containing the material, Fig. 7 is a similar view illustrating the upper plungers entering the mold to compress the material therein, Fig. 8 is a similar view illustrating the withdrawal of the lower plungers and the partial depression of the molded material by the upper plungers and the position of a pallet beneath the formed material, Fig. 9 is a similar view illustrating the manner in which the formed material is ejected from the mold and carried forward upon the pallets, Fig. 10 is a similar view illustrating the lower plungers and the upper plungers returning to their normal position, and the mold ready to be refilled, Fig. 11 is a similar view illustrating the mold in a shifted position beneath the material hopper, and ejecting a pallet from the pallet magazine, Fig. 12 is a perspective view of a portion of the pallet magazine.

To put my invention into practice, I construct my improved machine upon a T-shaped base 1, the base carrying side frames 2 and 3 connected at their upper ends as at 4. The side frames are slotted to provide guide ways 5 and 6, the guide ways 5 guiding the ends of the cross head 7 movably mounted between the frames 2 and 3, said cross head being provided with depending plungers 8 constituting the upper plungers of my improved machine. The cross head 7 is supported by rods 9 carried by lower blocks 82 and cross shaft 10, said blocks being guided in the guide ways 6. Connected to the cross shaft 10 is a bifurcated toggle link 11, to which is pivotally connected, by a pin 12, the link 14, said link being pivotally held in the sockets 15 of a table 16, said table having a rear extension 17 and outwardly extending guide blocks 18, said guide blocks engaging in the guide ways 6 of the frames 2 and 3. The mechanism employed for vertically reciprocating the table 16, consists of providing the leg 19 of the base 1 with two bearings 20, in which bearings is journaled a shaft 21. Upon the outer ends of the shaft 21 are mounted cam wheels 22 and engaging the under side of said cam wheels are rollers 23 revolubly mounted upon the ends of crank arms 24, carried by a shaft 25 journaled transversely within the side frames 2 and 3. The ends of the shaft 25 protrude beyond the side frames and are provided with crank arms 26, said arms being connected by pitmen 27 to the guide blocks 18 of the table 16. It will thus be seen that when the shaft 21 is rotated, the table 16, toggles 11 and 14, rods 9, cross head 7 and plungers 8 will be slightly raised and lowered through the medium of the cams 22, shaft 25 and pitmen 27.

To move the cross head 7 and the plungers 8 independently of, or simultaneously with, or relatively to the table 16, I provide the cams 22 with wrist pins 28, said pins being connected by bars 29 to the pin 12 of the toggle links 11 and 14. The movement of the cross head 7 depends upon the motion of guide blocks 18 and also upon the movement of the toggle links 11 and 14. I can therefore obtain motions for cross head 7 different from guide blocks 18.

To drive the shaft 21, I mount upon the same a large spur wheel 30, said spur wheel meshing with a small spur wheel 31 mounted upon a drive shaft 32 journaled in bearings 33, carried by the side frames 2 and 3 and the center bearings 20. The outer end of the shaft 32 is provided with a pulley wheel 34, whereby the machine can be driven from a suitable source of energy. The frames 2 and 3 are provided with inwardly extending brackets 35 upon which is slidably mounted a mold 36, said mold having a plurality of openings 37 formed therein which conform in shape to the article to be produced from plastic material by my improved machine. The mold is normally located beneath the plungers 8, and is provided with a rear extension 38 normally closing the lower end of a hopper 39 adapted to contain the material to be molded. The hopper 39 is supported by brackets 40 between the frames 2 and 3. The mold is horizontally reciprocated by rods 41 adjustably connected, as at 42, to levers 43, said levers being pivotally mounted, as at 83 in the bearings 20. The levers 43 are provided with rollers 44, said rollers engaging a cam 45, forming part of gear 30, located upon the shaft 21.

Suitably secured, as at 46, to the hopper 39 is a pallet magazine 47 containing pallets 48. The lower end of the magazine is cut away and provided with brackets 49 adapted to support the pallets within the magazine. Carried by the magazine is an inclined chute 50, for deflecting the pallets 48 when moved from the magazine by the rearward extension 38 of the mold 36.

To support the pallets 48 as they descend from the inclined chute and to carry said pallets forward beneath the mold 36 and lower the same at predetermined times, I use a novel mechanism illustrated in Figs. 4 and 5 of the drawings. The mechanism consists of two cross bars 51, having depending rods 52, supported by coiled springs 53 upon brackets 54, carried by the side frames 2 and 3. The lower ends of the rods 52 are provided with nuts 55 to limit their upward movement. The bars 51 are provided with grooves 56 for longitudinally disposed rails 57 and 58, the rails 57 being located upon the inner sides of the rails 58. The cross bars 51 are provided with depending pins 59 carrying nuts 60 upon their lower ends. The pins 59 pass through brackets 61 carried by the table 16. It is the function of said pins, nuts and brackets to draw downward the cross bars 51 and rails 57 and 58, together with the pallet and formed material when said material has been forced from the mold, thus relieving the pressure of said material against the top plunger, permitting the pallet to move forward.

The rails 58 are slotted, as at 62, and extending through said slots are pins 63 carried by the rails 57. Upon the ends of the pins 63 are journaled rollers 64. Fastened to the rails 58 by pins 84 are the revoluble rollers 85, said rollers 64 and 85 engaging in the channel-shaped ends 65 of arms 66, said arms being pivotally connected as at 67, to the side frames 2 and 3 of the machine. Journaled upon the inner sides of the arms 66 near their lower ends are rollers 68 adapted to engage elliptical-shaped cams 69 mounted upon the shaft 32. The arms 66 are connected by coiled springs 70.

The rails 57 rest on the bars 51 in the slots 56. The rails 58 rest on the strips 71 which in turn rest on the bars 51 in the slots 56. Strips 71 are provided with inclined surfaces 72. The rear ends of the strips 71 are provided with revoluble rollers 73 adapted to engage in the channel shaped ends 74 of levers 75, said levers being arranged upon the inner sides of the frames 2 and 3 and connected thereto as at 76. The ends of the levers are provided with revoluble rollers 77, said rollers engaging cams 78 mounted upon the shaft 32. The levers 75 are held in engagement with the cams by coiled springs 79 attached to the side frames 2 and 3. The function of the strips 71 with their inclined surfaces is to raise and lower rails 58 with respect to the rails 57, when said rails 58 are moving forward or rearward respectively. To temporarily hold the pallets 48 while formed material is being placed upon the same I provide the inwardly extending brackets 35 with lugs 80, the pallets being lowered to clear these lugs when the formed material is being removed from the machine.

Slidably mounted upon the table 16 and movable horizontally with the mold 36 are plungers 81, these plungers constituting the lower plungers of the machine and conforming in shape to the plungers 8 and the openings 37 of the mold 36.

The operation of my improved machine can be readily understood by referring to Figs. 6 to 11 inclusive in connection with Figs. 1 and 4. The mold 36 is moved beneath the hopper 39 to receive material, this being accomplished through the medium of the rods 41, levers 43 and cams 45. The mold 36 when beneath the hopper has the lower ends of the openings 37 closed by the lower plungers 81 resting upon the table 16. When the mold has been removed to this position, a pallet 48 is removed from the magazine 47 and allowed to descend upon the rails 57 and 58, where the pallet is supported and is moved forward by the successive strokes of the rails. On the forward strokes of the rails 57, rails 58 are dropped slightly below, through the operation of the inclined surfaces 72 of the strips 71. When the openings 37 of the mold have been filled the mold is moved forward to the position illustrated in Fig. 6 of the drawings, the rearward extension 38 closing the hopper 39, and the brackets 49 supporting the pallets 48 within the magazine 47. The upper plungers 8 are now actuated to compress the material within the mold 36, and immediately upon compression, the table 16 is lowered sufficiently to allow a pallet to pass under the mold 36 and engage the lugs 80, said pallet being supported by the rails 57 and 58. The table 16, the rails 57 and 58 and the upper plungers 8 are now actuated in unison, the plungers 8 force the compressed or formed material from the mold 36 upon the pallet and the rails 57 and 58 are forced downwardly by the descending molded material. Friction of the brick on the upper plunger, due to the pressure from springs 53, prevents the pallet from moving forward as soon as the pallet clears lugs 80, but as soon as the material is free from the mold, lugs 61 engage with nuts 60, which are suitably adjusted and pull the bars 51, rails 57 and 58 and the pallet with the formed material free from the top plungers. The pallet is then moved forward by rails 57, 58, which are in constant reciprocation. Immediately following this operation, the table 16, rails 57 and 58 and plungers are returned to their normal position illustrated in Fig. 10 of the drawings and the mold is again ready to be moved backward to receive a fresh supply of material from the hopper 39.

The novel mechanism including the toggle links 11 and 14 and the cam actuated pitmen 27 permit of the upper and lower plungers being moved in the manner just described, and through the medium of the cams 69 and 78, together with the inclined surfaces 72, the rails 57 and 58 can be rhythmically actuated to carry the pallets forward.

My invention principally resides in the horizontally moving mold, the stripping operation whereby the formed material is removed from the mold by a downward motion of the plungers, and the novel means for automatically removing a pallet from its magazine, and carrying the same forward to receive and remove the molded material. In order to use the horizontally moving mold, I have found it necessary to devise the movable table and plungers, and have employed novel mechanism for insuring a positive coöperation of these parts. I am enabled by the novel construction of the machine to change the molds and plungers without the loss of much time, and while I have herein described and illustrated the preferred arrangement and mechanism for expeditiously and economically molding bricks or blocks, I desire it to be understood that such changes in the minor details of construction as are permissible by the appended claims, may be resorted to without departing from the spirit and scope of the invention.

What I claim and desire to secure by Letters Patent, is:—

1. In a molding machine, the combination with a base plate, and slotted side frames carried thereby, of upper plungers movably mounted in said frames, a table movably mounted in said frames, plungers movably supported upon said table, a horizontally movable mold between said plungers, a hopper normally closed by said mold, a pallet magazine carried by said hopper, rails movably supported beneath said mold for supporting and moving said pallets, means carried by said frames for moving said mold to simultaneously receive material from said hopper and move a pallet from said magazine, means carried by said frame for raising and lowering said table and plungers, and means for imparting an oscillating movement to said rails for moving said pallets.

2. In a molding machine, the combination of a frame, and a driven shaft journaled in said frame, movable plungers mounted in said frame, a table movably mounted in said frame, plungers movably supported by said table, a horizontally reciprocating mold mounted between said plungers, a hopper carried by said frame, and normally closed by said mold, a pallet magazine carried by said frame, movable rails arranged beneath said mold for supporting pallets, means actuated by said shaft for raising said table and plungers, means actuated by said shaft to reciprocate said mold and simultaneously position the same for receiving material from said hopper and removing a pallet from said magazine, and means carried by said frame for oscillating said rails to move said pallets beneath said mold.

3. A machine of the type described consisting of side frames, plungers movably mounted between said side frames, a table movably mounted between said side frames, plungers movably mounted upon said table, a hopper carried by said frames, a pallet magazine carried by said hopper, a horizontally reciprocating mold adapted to normally close said hopper, means connecting with said mold to move the same for receiving material from said hopper and removing pallets one at a time from said magazine, and mechanism located beneath said mold for supporting said pallets and moving said pallets beneath said mold, and means to vertically reciprocate said table and plungers, all of said means being actuated from a common shaft journaled in said frames.

4. A machine of the type described consisting of side frames, vertically reciprocating plungers arranged between said side frames, a horizontally reciprocating mold mounted between said plungers and between said side frames, a hopper carried by said frames and normally closed by said mold, a pallet magazine supported by said hopper, and mechanism mounted between said frames beneath said mold for supporting pallets, means to actuate said mold for simultaneously receiving material from said hopper and removing pallets from said magazine, means for actuating said mechanism to move pallets beneath said mold, and means to vertically reciprocate said plungers.

5. In a concrete block forming machine, a horizontally reciprocating mold having an extension, a hopper for concrete located adjacent the mold, the said extension of the mold constituting the bottom for said hopper, vertically reciprocating upper plungers adapted to enter said mold from above the same, a vertically movable table, lower plungers supported on said table to enter the mold from below the latter, a pallet magazine supported in position with relation to said hopper and mold, so as to have the pallets stripped therefrom by the extension of said mold, reciprocable pallet-supporting and conveying means between the mold and the table, and comprising two pairs of spring-supported rails on which the pallet is received, means for elevating one pair of said rails with respect to the other pair thereof insuring reciprocation of said rails, means for temporarily arresting the movement of the pallet and holding the same positioned beneath the mold, and means for depressing the upper plungers simultaneously with the position of the pallet underneath the mold to force the molded block from the mold onto said pallet.

6. In a concrete block forming machine, a horizontally reciprocating mold having an extension, a concrete receiving hopper normally closed at the bottom by the extension of said mold, a vertically reciprocating upper plunger, a vertically movable table, a lower plunger supported on said table, the said lower plunger constituting the bottom of the mold during the pressing operation, a pallet magazine disposed in position to have the pallets stripped therefrom by the extension of said mold, a reciprocating pallet-conveying means arranged between the mold and the table, and comprising two pairs of spring-supported rails on which the pallet is received, means for elevating one pair of said rails with respect to the other pair during reciprocation thereof, and means for operating said plungers and said pallet-conveying means.

7. In a molding machine, the combination of a frame, upper plungers movably mounted therein, a table movably mounted in said frame, plungers carried by said table, a mold mounted between said plungers, and the upper plungers, a hopper carried by said frame and adapted to fill said mold, means carried by said frame for compressing material in said mold by a downward motion of said upper plungers, means for stripping the molded material from said mold by a further downward motion of said upper plungers, a pallet located beneath said mold and adapted to receive the molded material, and means for automatically moving said pallet from beneath said mold.

8. In a concrete block forming means, a horizontally movable mold, a vertically movable table arranged beneath said mold, a lower plunger carried by the table constituting a bottom for the mold when the table is in the elevated position, a vertical reciprocatory plunger adapted to enter said mold from the top, pallet-conveying means arranged beneath the mold, means for imparting reciprocatory movement to said pallet-conveying means, means for positioning pallets carried by said pallet-conveying means underneath the mold and temporarily holding the same in said position, and means for lowering the pallet-conveying means as the table is lowered.

9. In a concrete block forming machine, the combination with a horizontally reciprocating mold, and upper and lower plungers therefor, of pallet-conveying means comprising reciprocatory rails disposed beneath the mold and supported for vertical movement toward and away from the mold, and means for reciprocating said rails longitudinally to position a pallet underneath the mold.

10. In a molding machine of the type described, vertical reciprocatory upper plungers, a vertically movable table, lower plungers carried by said table, a mold mounted between said plungers, means for elevating the table to position the lower plunger in the bottom of the mold and simultaneously lowering the upper plunger to compress material within the mold between the upper and the lower plungers, means for effecting a further downward movement of the upper plungers to strip the molded material from the mold, and horizontally-reciprocable and vertically-movable pallet-supporting and conveying means between the mold and the table, said means comprising two pairs of spring-supported rails reciprocable in unison, means for elevating one pair of said rails with respect to the other pair during reciprocation thereof.

11. In a molding machine of the type described, a horizontally reciprocating mold, an upper plunger mounted for vertical movement and adapted to enter said mold from the top thereof, a table arranged for vertical movement beneath the mold, a lower plunger carried by said table to enter said mold from the bottom thereof, means for operating the table to position the lower plunger in the bottom of the mold and automatically lower the upper plunger to compress the material in the mold between said upper and lower plunger, means for automatically lowering the table to withdraw the lower plunger and simultaneously to effect a further downward movement of the upper plunger to strip the molded material from the mold, and horizontally-reciprocable and vertically-movable pallet-supporting and conveying means between the mold and the table, said means comprising spring-supported rails on which the pallet is received, and means for elevating some of said rails independently of the remainder of the rails.

12. In a molding machine of the type described, two opposed vertically movable plungers, a horizontally movable mold arranged between said plungers, means for elevating the lower of said plungers to position the same to form the bottom of the mold, and simultaneously lower the upper of said plungers to cause it to enter the mold, means acting to lower the lower mold and effect a further downward movement of the upper mold to strip the molded material from within the mold, horizontally-reciprocable and vertically movable pallet-supporting and conveying means between the mold and the table, said means comprising a plurality of spring-supported rails upon which the pallet is received, and means for elevating certain of said rails independently of the remainder of the rails.

In testimony whereof I affix my signature in the presence of two witnesses.

WILLIAM T. PRICE.

Witnesses:
MAX H. SROLOVITZ,
K. H. BUTLER.